Sept. 29, 1936.                    E. THEILER                    2,055,884
                              GLASS MOLDING MACHINE
                              Filed Jan. 23, 1935
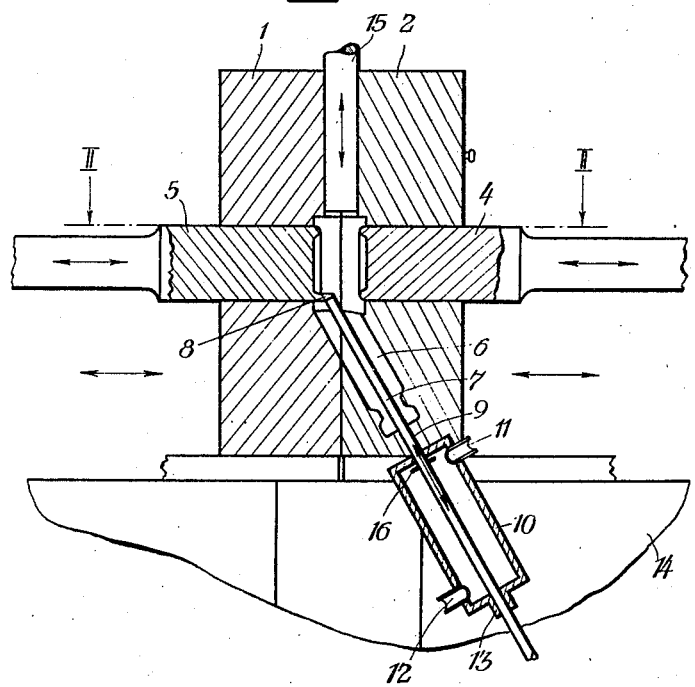
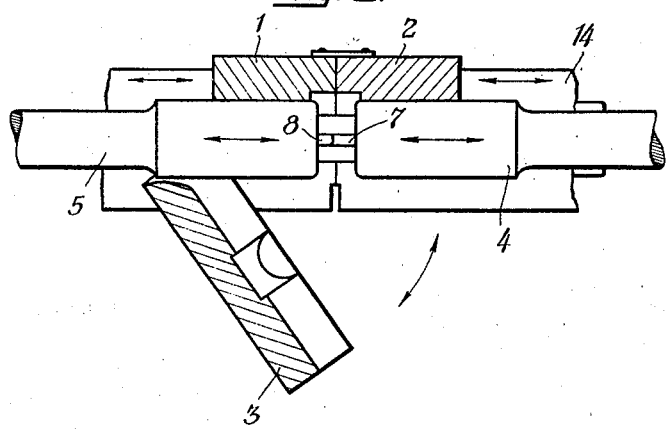
Inventor:
EWALD THEILER
ATTORNEYS Patented Sept. 29, 1936

2,055,884

UNITED STATES PATENT OFFICE 2,055,884

GLASS-MOLDING MACHINE

Ewald Theiler, Berlin-Wilmersdorf, Germany

Application January 23, 1935, Serial No. 3,123
In Germany January 4, 1935

9 Claims. (Cl. 49—76)

My invention relates to glass-molding machines and more particularly to machines equipped with a reciprocating core which alternately penetrates into, and is retracted from, the article-forming cavity of the mold.

It is an object of my invention to provide a glass-molding machine in which the life of the reciprocating core is prolonged.

To this end, I provide means, such as a cooling chamber in which the core reciprocates, for effecting a flow of cooling medium about the retracted core.

It is another object of my invention to eliminate the necessity of using expensive non-oxidizing material, such as platinum, for the core.

To this end, I employ an inert cooling medium and may then make the core of a material which is subject to oxidization, and is cheaper than platinum or the like.

It is old in the art to which my invention appertains to charge a mold with liquid molten glass, and to form holes or passages in the articles during the molding operation, by placing thin wire cores in the article-forming cavity of the mold which are retracted before the article is removed from the cavity. When the article has been removed, the cores are re-inserted for the next operation.

It has been found, however, that this method is not satisfactory for the manufacture of articles with holes or passages therein, as the cores, being thin, soon become warped and, after a few molding operations, cannot be extracted without damaging the articles, or stick in the articles altogether.

This is not surprising if it is considered that the cores which are ⅛ to 1/16 in. thick, are alternately heated to 1600 to 1800 centigrade, and cooled to the temperature of the ambient air.

It has already been proposed to cool the pressing plungers of glass-molding machines after they have been retracted, by directing a jet of air against one side of the plungers. The plungers, however, are of much larger diameter than the thin cores referred to, and slight deformations of the plungers which may be caused by such one-sided cooling, are of minor importance, as the plungers are not embedded in the glass articles but only exert pressure thereon from above.

It is indispensable that the thin cores by which narrow and long passages are formed in the articles, should be cooled as often as they are retracted, but such cooling must be performed scientifically if it is to be successful, and blowing a jet of air against one side of a core, as in the case of the aforesaid pressing plungers, is not the proper way of cooling the core.

I have found that it is necessary to effect a flow of cooling medium about the retracted core, and, in a preferred embodiment of my invention, I mount a reciprocating core in a cooling chamber or cylinder where it is open to the flow of the cooling medium, such as air, on all sides. The ends of the core are supported in suitable bores in axial alignment with the core.

By these means, I have succeeded in providing a practicable molding machine in which good articles are molded with narrow passages, and the core, or cores, can be used again after each operation, and I have solved the problem of making articles of the kind referred to on a quantity-production basis.

In the accompanying drawing, a glass-molding machine embodying my invention is illustrated by way of example.

In the drawing

Fig. 1 is a vertical longitudinal section of the machine, and

Fig. 2 is a section on the line II—II in Fig. 1.

Referring now to the drawing, 14 is a base member, and 1, 2, and 3 are the mold parts which are connected to each other and to the base member 14 by suitable hinges or the like, not shown. The pressing plunger 15 is mounted to reciprocate in the passage for charging the molten glass. The mold parts, 1, 2, and 3, and two blocks 4 and 5, define the article-forming cavity 6 of the mold. A reciprocating core 7 is mounted to slide in a bore 9 of the mold at one end, and in a sleeve 13 of a cooling cylinder or jacket 10 at the other or lower end. A check 16 on the core 7 limits its reciprocation and prevents the upper end of the core from leaving the bore 9 when the core is retracted. The core 7 forms a comparatively long passage in the article, and a short core extension 8 is provided on the inner end of block 5 so as to form a short extension at an angle to the upper end of the long passage.

The means for advancing and retracting the core may be of any suitable design and have not been shown. When the core has been retracted, its heated portion is in the cooling cylinder 10 but its upper end is still in the bore 9 of the mold. Conversely, when the core is advanced as shown, its lower end is still in the sleeve 13, the movement of the core in opposite directions being limited by the ends of the chamber or cylinder 10, and the check 16. The core is always supported at both ends, and aligned axially. Means such as pipes 11 and 12, connected to a suitable pump or the like, not shown, are connected to the chamber or cylinder 10 for effecting a flow of cooling air, or other medium, about the heated core 7 after it has been retracted from the cavity 6. The core is accessible to the cooling medium on all sides, the cooling action is uniform, and local cooling which leads to warping and other deformations, is avoided.

As mentioned, the cooling medium which flows about the core 7 in the chamber or cylinder 10, may be inert so that it is not necessary to make the core of platinum, or other expensive non-corroding material. As the inert gas circulates in a closed circuit, it is recovered practically without loss.

It is understood that I may provide as many cores as may be required for the manufacture of a given article.

I claim:

1. In a glass-molding machine, a mold defining an article-forming cavity, a core mounted to alternately penetrate into, and to be retracted from, said cavity, the front end of the core being guided in a bore of said mold, a cooling chamber surrounding said core, a sleeve on said chamber for guiding said core in axial alignment to said bore, a check for limiting the movement of said core so that it remains in said bore and said sleeve in all positions and means for effecting a flow of cooling medium about the retracted core in said chamber.

2. In a glass molding machine, a mold defining an article forming cavity, a core mounted to alternately penetrate into and to be retracted from said cavity, and means effecting a flow of cooling medium about a portion of the core located beyond the cavity in the penetrated position of the core, said means confining the circulation of cooling medium around the portion of the core beyond the cavity and also operable to cool the portion of the core in the cavity when the latter portion is retracted.

3. In a glass molding machine, a mold defining an article forming cavity, a core mounted to alternately penetrate into and to be retracted from said cavity, means for effecting a flow of cooling medium about the core as it is retracted from the cavity, and guiding means for the core located at a point to slidably engage the core prior to exposing the latter to the direct action of the cooling medium.

4. In a glass molding machine, a mold defining an article forming cavity, a core mounted to alternately penetrate into and to be retracted from said cavity, means operable in the penetrated position of the core to effect a flow of cooling medium about a portion of the core located outside of the cavity and also operable to cool the portion of the core in the cavity as the latter portion is retracted, and guiding means for the core located at a point to slidably engage the core prior to exposing the latter to the direct action of the cooling medium.

5. In a glass molding machine, a mold defining an article forming cavity, a core mounted to alternately penetrate into and to be retracted from the cavity, guide means spaced axially of the core and slidably engageable with the core to align the same, and means for effecting a flow of cooling medium about the core between the guide means.

6. In a glass molding machine, a mold defining an article forming cavity, a core mounted to alternately penetrate into and to be retracted from said cavity, guide means engageable with the core at the entrance of the latter to the cavity, additional guide means spaced axially from the guide means aforesaid and also slidably engageable with the core, means restricting the extent of reciprocation of the core to maintain the same in engagement with the guide means in both of the aforesaid positions of the core, and means effecting a flow of cooling medium around the core between the guide means.

7. In a glass molding machine, a mold defining an article forming cavity, a core mounted to alternately penetrate into and to be retracted from the cavity, guide means spaced axially of the core and engageable with the latter in the retracted position of the same, and means effecting a flow of cooling medium about the core between the guide means.

8. In a glass molding machine, a mold defining an article forming cavity, a core mounted to alternately penetrate into and to be retracted from said cavity, guide means spaced axially of the core beyond the cavity and engageable with the core throughout movement thereof to align the same, and a casing surrounding the core between the guide means and adapted to contain a cooling medium.

9. In a glass molding machine, a mold defining an article forming cavity, a core mounted to alternately penetrate into and to be retracted from said cavity, means effecting a flow of cooling medium around the portion of the core located beyond the cavity in the penetrated position of the core and also operable to cool the portion of the core in the cavity when the latter portion is retracted, said means comprising a jacket around the core elongated in the direction of the axis of the latter and having a length approximating the length of the portion of the core in the cavity.

EWALD THEILER.